United States Patent [19]
Ungerer

[11] 3,881,042
[45] Apr. 29, 1975

[54] ADHESIVE BARRIER FOR PLASTIC TRIM STRIP

[75] Inventor: Aaron J. Ungerer, Schenectady, N.Y.

[73] Assignee: The Standard Products Company, Cleveland, Ohio

[22] Filed: Oct. 3, 1973

[21] Appl. No.: 403,185

[52] U.S. Cl. .................. 428/67; 156/289; 156/537; 428/164; 428/172
[51] Int. Cl. ........................... B44f 1/04; B60r 13/04
[58] Field of Search .......................... 161/4–6, 214, 161/218, 147, 139, 116, 118, 122, 138, 18, 19; 156/289, 537

[56] References Cited
UNITED STATES PATENTS

| | | | |
|---|---|---|---|
| 3,086,216 | 4/1963 | Brooks et al. | 161/214 X |
| 3,322,610 | 5/1967 | Brooks et al. | 161/214 X |
| 3,681,180 | 8/1972 | Kent | 161/214 X |
| 3,687,792 | 8/1972 | Ruff | 161/5 X |
| 3,755,052 | 8/1973 | Dressler | 161/5 X |
| 3,802,945 | 4/1974 | James | 161/139 X |
| 3,811,989 | 5/1974 | Hearn | 161/6 X |
| 3,833,456 | 9/1974 | Reed et al. | 161/147 X |
| 3,839,129 | 10/1974 | Newmann | 161/5 X |
| 3,843,475 | 10/1974 | Kent | 161/6 X |

*Primary Examiner*—Harold Ansher
*Attorney, Agent, or Firm*—Meyer, Tilberry & Body

[57] ABSTRACT

A decorative trim strip is provided comprised of a vinyl plastic body portion having an outer surface covered by a film of metallized polyethylene terephthalate which is adhered to the body portion with the metallized surface facing the outer surface of the body portion. The polyethylene terephthalate is transparent, whereby the metal layer is visible therethrough. The metallized film has edge portions and an intermediate portion therebetween. Only the edge portions of the film are adhered to the outer surface of the body portion. Various structures are provided for inhibiting a bond between the intermediate portion of the metallized face of the polyethylene terephthalate and the outer surface of the vinyl body portion.

12 Claims, 7 Drawing Figures

ADHESIVE BARRIER FOR PLASTIC TRIM STRIP

The present invention relates to the art of decorative trim strips and, more particularly, to trim strips having a body portion of a synthetic resin and a decorative film adhered to the outer surface of the body portion for aesthetic purposes.

Trim strips have been provided heretofore for a variety of purposes and, in recent years, have been used to provide decorative and protective exterior trim for vehicles such as automobiles. With regard to the latter use, such trim strips are becoming widely used for many reasons including economy in cost in installation, compatibility with vehicle colors, and the ability to produce the strips so that they appear to be metal or wood or appear to have portions which are metal or wood. Moreover, all of the foregoing desirable characteristics of such trim strips are achieved without the use of metallic fasteners heretofore required with metal or wood trim. In this respect, the plastic trim strips can be mounted on a vehicle panel such as by double faced adhesive tape interposed between the trim strip and vehicle panel. This lends to a reduction in installation time. For all of these reasons, such plastic trim strips are becoming widely used by the automotive industry as well as by the consumer who can purchase such strips and trim his automobile to suit his personal taste.

The decorative effect provided by such plastic trim strips is achieved in a number of different ways. For example, the exposed outer surface of the trim strip may be embossed during production to provide the outer surface with a desired grain effect. One decorative effect being used extensively either alone or in conjunction with such a grain effect is provided by adhering a film of metallized plastic to the exposed outer surface or a portion of the exposed outer surface of a plastic body. The plastic film is transparent, whereby the metal coating is visible therethrough and gives the trim strip the appearance of chrome.

Such transparent film is also employed to provide effects in appearance other than a metallic effect. For example, the surface of the transparent plastic may be coated with a material to provide any desired color visible therethrough or can be preprinted to provide a coating thereon having the appearance of wood grain. Further, the metallic effect can be achieved other than by a coating of metal and in this respect can be defined by a film of metal foil adhered to the transparent plastic.

In the production of such trim strip, the body portion is generally produced by extrusion to provide the desired cross-sectional configuration, and the transparent plastic film with the decorative material previously applied thereto is positioned in overlying relationship with the outer surface of the body portion immediately following the extrusion thereof. More particularly, the plastic film is positioned in overlying relationship with the outer surface of the body portion while the latter is still hot, and pressure is applied to the film to cause the decorative material carrying face thereof to be heat sealed to the body portion. Alternatively, the decorative material carrying face of the plastic film can be bonded to the outer surface of the body portion by a suitable adhesive interposed therebetween. In either event, the decorative material carrying face of the plastic film is adhered in its entirety to the underlying outer surface of the body portion.

The foregoing relationship results in certain undesirable characteristics in the appearance of the trim strip, some of which become apparent upon manufacture of the strip and often are exaggerated upon use of the strip, and others of which become apparent during use of the strip. More particularly, it will be appreciated that the outer surface of the plastic body portion may have imperfections such as waviness, longitudinal scratches, or raised longitudinal ridges resulting from extrusion of the plastic through the extrusion die opening. Such imperfections may only appear occasionally in a given length of extruded strip or may appear continuously throughout a given length of the strip. These imperfections, only some of which are readily visible to the naked eye, do not appear to be of any consequence. However, when the plastic film carrying the decorative material is adhered to the outer surface of the extruded body the imperfections can and often do become readily apparent to the naked eye and disadvantageously detract from the decorative appearance intended.

More particularly, the application of the plastic film to the body portion of the strip in the manner described hereinabove causes the plastic film and the decorative material carried thereby to become homogeneous with the body portion of the strip. Thus, any waviness or other imperfection in the outer surface of the strip becomes more readily apparent in that the imperfection causes a corresponding interruption in the otherwise substantially uniform decorative appearance of the decorative material. Such imperfections or interruptions stand out visibly. Moreover, if the decorative material is a coating of metal on the plastic film, the specularity of the metallized surface causes such imperfections to be exaggerated and more readily visible. Further, such decorative trim strips during use are generally bent or formed to conform with the underlying surface on which they are to be mounted. Such bending or forming may bring out defects or imperfections which were not previously visible and may further exaggerate those imperfections which were visible following manufacture of the strip. It will be appreciated that any imperfection tending to detract from the uniform decorative appearance of such trim strips is undesirable and can result in a substantial quantity of trim strip produced being unacceptable for use.

In accordance with the present invention, trim strip structures of the character described hereinabove are provided wherein the appearance of imperfections through the decorative film applied to the body portion are minimized or eliminated. More particularly, in accordance with one aspect of the present invention, the transparent plastic film carrying the decorative material is bonded to the body portion of the trim strip along edge portions only of the plastic film so that the intermediate portion of the decorative material is not bonded to the body portion and is not pressed thereagainst during manufacture of the strip. This advantageously provides for the plastic film and decorative material thereon to take its own contour relative to the outer surface of the body, whereby the tendency of imperfections in the outer surface of the body underlying the plastic film and decorative material to distort the plastic film or show through the latter is minimized.

In accordance with another aspect of the present invention, a recess is provided in the outer surface of the body portion or in the decorative material on the inner face of the plastic film so that a void is formed between the decorative material and body portion. Such a void advantageously provides a space for maintaining the decorative material out of contact with the body portion to eliminate the appearance of imperfections. This relationship is of further importance in that it substantially precludes adhesion between the decorative material and body portion during extended use of a trim strip such as might result under conditions of heat if the decorative material and body portion were in contact with one another.

In accordance with another aspect of the present invention, the appearance of imperfections through the plastic film and decorative material is avoided by providing a coating on one or the other of the decorative material and outer surface of the body portion to inhibit a bond therebetween during manufacture and use of the trim strip.

Accordingly, it is an outstanding object of the present invention to provide a nometallic decorative trim strip of the character including a body of a synthetic resin having an outer surface to which a film of transparent plastic having decorative material thereon is secured such that the appearance of imperfections in the outer surface of the body portion through the decorative material and transparent film is minimized or eliminated.

Yet another object is the provision of a decorative trim strip of the foregoing character wherein the plastic film carrying the decorative material is bonded to the body portion only along edge portions of the film to minimize the effect of imperfections in the outer surface on the decorative material and/or transparent plastic in the areas thereof intermediate the side portions.

Still another object is the provision of a decorative trim strip of the foregoing character in which the intermediate portion of a decorative material on the transparent plastic is spaced from the outer surface of the body portion to avoid adherence therebetween and to eliminate any distortion or disfiguration of the decorative material and/or transparent plastic by imperfections in the outer surface of the body portion.

Yet another object is the provision of a decorative trim strip of the foregoing character wherein the intermediate portion of the decorative material on the transparent plastic and/or the underlying outer surface of the body portion is provided with a bond inhibiting coating to inhibit adhesion therebetween during manufacture and use of the trim strip.

A further object of the present invention is the provision of a decorative trim strip of the foregoing character wherein the transparent plastic and decorative material thereon are structurally interrelated with the body portion of the trim strip to increase uniformity of decorative appearance by minimizing imperfections tending to detract from the decorative appearance.

The foregoing objects, and others, will in part be obvious and in part will be pointed out more fully hereinafter in conjunction with the following description of the drawing illustrating preferred embodiments of the present invention and in which.

Figure 1:
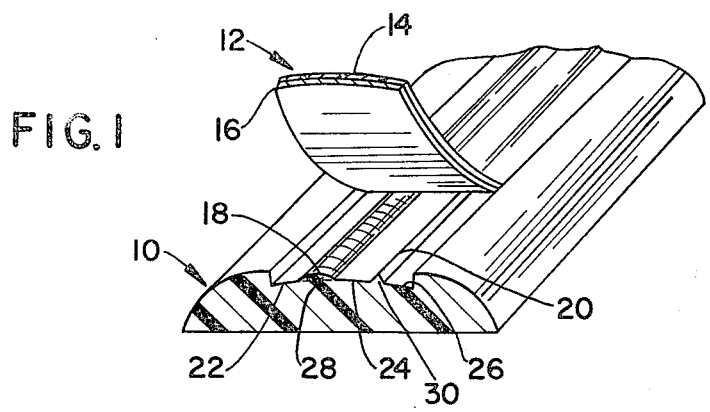
FIG. 1 is a perspective view, partially in section, of a trim strip having imperfections in the outer surface of the body portion.
Figure 2:
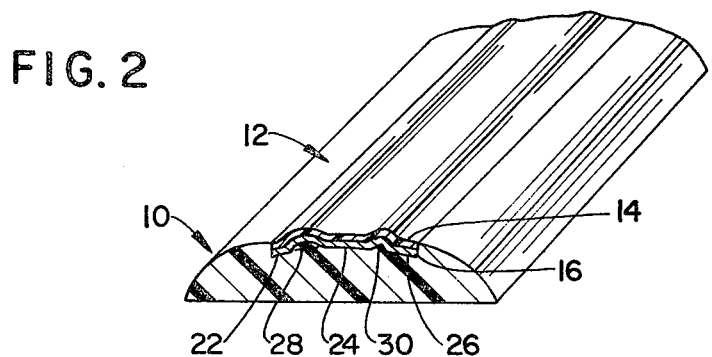
FIG. 2 is a perspective view, in section, illustrating the effect of imperfections on the transparent film and decorative material adhered to the outer surface of the body portion in accordance with prior practices.

Referring now in greater detail to the drawings wherein the showings are for the purpose of illustrating preferred embodiments of the present invention only and not for the purpose of limiting the same, a trim strip structure is depicted in FIGS. 1 and 2 which illustrates the effects of imperfections in the outer surface of the body portion on the decorative appearance of the trim strip when made in accordance with prior practices. More particularly, the trim strip is comprised of a body portion 10 of a synthetic resin, such as vinyl, and a decorative cover strip 12 comprised of a strip or film of transparent plastic 14 which carries a layer or coating of decorative material 16 on the side thereof facing the body portion. Film 14, for example, by polyethylene terephthalate and decorative material 16 may, for example, be defined by a coating of metal such as aluminum vapor deposited on film 14. When cover strip 12 is adhered to body portion 10 the metallized surface is visible through transparent film 14 giving the portion of the trim strip covered by strip 12 the appearance of chrome or the like.

Generally, trim strips of the character illustrated in FIGS. 1 and 2 are produced by extruding body portion 10 and, while the body portion is still hot, positioning cover strip 12 relative to the outer surface of the body portion and applying pressure thereto achieve a heat seal bond between the cover strip and body portion throughout the area of engagement therebetween transversely and longitudinally of the body portion.

During extrusion of the body portion, imperfections such as the waviness designated by numeral 18 in FIG. 1 often appear in the outer surface of the body portion intermittently or continuously along a given length thereof. Another form of imperfection which can appear in the outer surface is a scratch or gouge extending longitudinally of the trim strip and which generally leaves a raised edge in the outer surface such as that designated by the numeral 20 in FIG. 1. Such imperfections may result from defects in the contour of the extrusion die, variance in the continuity of the extrusion pressure, or the occurrence of a particle of foreign matter such as dirt in the plastic which momentarily engages or becomes permanently engaged with the edge of the die opening so as to effect the designed contour of the extruded material. Many other imperfections can and do occur as a result of the above and other circumstances surrounding the extrusion process, and the examples depicted in FIGS. 1 and 2 are intended merely to illustrate the physical characteristics of such imperfections and the effect thereof on the finished trim strip product. Further, the degree of dimensional variation in the contour of the outer surface of the body portion from the intended or designed contour is exaggerated in FIGS. 1 and 2 to more clearly illustrate the effect of such imperfections on the final product.

As mentioned hereinabove, cover strip 12 is adhered to the outer surface of body portion 10. For purposes of the present description, the outer surface of body portion 10 is intended to be that portion of the exposed surface of the trim strip which is covered by cover strip 12. Accordingly, in FIGS. 1 and 2 the outer surface of the body portion is the longitudinal and transverse area of body portion 10 underlying strip 12. While this area is illustrated as being recessed to an extent corresponding to the thickness of strip 12, it will be appreciated that many other configurations are possible, and that the cover strip 12 could extend transversely to the corresponding side edges of the body portion as opposed to being disposed in an intermediate area thereof.

Referring now to FIG. 2, cover strip 12 is illustrated in its final disposition overlying the outer surface of body portion 10 and the imperfections 18 and 20 illustrated in FIG. 1. The application of pressure to cover strip 12 to achieve a heat seal bond does not remove the imperfections in the outer surface in that the extruded plastic material has hardened sufficiently to withstand deformation resulting from the bonding pressure applied to the cover strip. Accordingly, the imperfections remain in the outer surface of the body portion and the cover strip, in conforming to the outer surface, becomes correspondingly distorted from the designed contour. More particularly, the outer surface of the body portion, in transverse section for example, has a designed contour which, in the embodiment illustrated in FIGS. 1 and 2, is a convex contour of uniform curvature denoted by solid lines 22, 24 and 26 and broken lines 28 and 30. It will be seen that imperfections 18 and 20 project upwardly from the designed contour of the outer surface, whereby the portions of strip 12 overlying the imperfections are distorted to interrupt the uniformity of curvature of the strip in transverse cross section. If decorative material 16 is a coating of metal on transparent film 14, the specularity of the metallized surface visible through film 14 tends to exaggerate these distortions making the imperfections more readily visible. Further, bending or forming of the trim strip during use thereof often causes the imperfections to be further emphasized, thus further detracting from the decorative appearance otherwise provided by the transparent film and decorative material thereon.

In accordance with the present invention, the effect of imperfections in the outer surface of the body portion of the trim strip is advantageously minimized or eliminated so that uniformity in appearance throughout a given length of trim strip can be more readily achieved. The manner in which the effect of such imperfections is eliminated or minimized will be more fully understood in view of the following description of FIGS. 3–7 wherein preferred trim strips made in accordance with this invention are illustrated. The embodiments illustrated in FIGS. 3–7 include the same basic components of the trim strip illustrated in FIGS. 1 and 2, namely a body portion 10 and a cover strip 12 comprised of a transparent plastic film 14 carrying decorative material 16 on the surface thereof facing the outer surface of the body portion. Accordingly, these components of the trim strip structures illustrated in FIGS. 3–7 are designated by the same numerals as appear in FIGS. 1 and 2.

In accordance with the present invention, imperfections appearing in the cover strip of a decorative trim strip structure are minimized or eliminated by providing for edge portions only of the cover strip to be adhered or bonded to the underlying outer surface of the body portion. The intermediate portion of the cover strip extending longitudinally thereof and laterally between the edge portions is not bonded to the outer surface as heretofore provided and, accordingly, the cover strip as a whole maintains its own form independent of defects or imperfections in the outer surface of the body portion. Thus, the tendency for imperfections in the outer surface of the body portion to be noticeable or visible upon viewing the cover strip is minimized if not eliminated.

Figure 3:
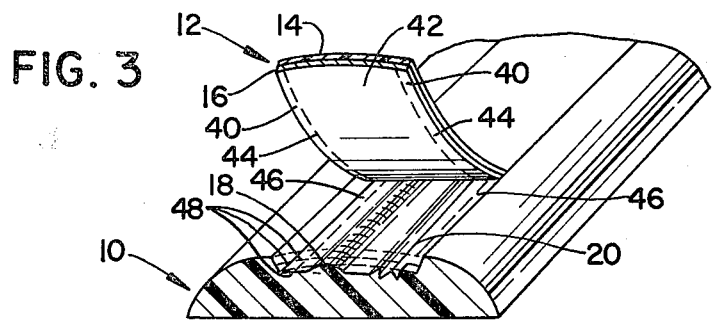
FIG. 3 is a perspective view, partially in section, of one embodiment of trim strip made in accordance with the present invention; and, FIGS. 4–7 are perspective views, partially in section, each illustrating a further embodiment of trim strip made in accordance with the present invention.

Referring to FIG. 3, cover strip 12 has side portions 40 and an intermediate portion 42. The width of side portions 40 relative to intermediate portion 42 are designated by imaginary lines 44 extending longitudinally of the cover strip. It will be appreciated that the lateral width of side portions 40 can vary and preferably, the side portions would have a lateral dimension no greater than that necessary to assure retention of the cover strip on body portion 10 as a result of adhesion between side portions 40 and the underlying portions 46 of the outer surface of body 10 to be covered by strip 12. Cover strip 12 can be adhered to the outer surface of the body portion in any desired manner such as by an edhesive interposed between side portions 40 of strip 12 and underlying portions 46 of the body or, preferably, by applying pressure to the side portions of strip 12 while the body portion is still hot following extrusion thereof to provide a heat seal therebetween.

Since the only bond between cover strip 12 and the outer surface of body portion 10 is also the side portions as described above, it will be appreciated that intermediate portion 42 of strip 12 will engage the underlying portion of the outer surface and, being free of any bond therewith, will take its own form relative to the surface as opposed to taking the contour of the surface in the manner illustrated in FIG. 2 of the drawing. More particularly in this respect, when strip 12 is brought into overlying relationship with the outer surfaces of the body portion and the side portions of the strip are pressed into engagement with the underlying portions of the body portion the intermediate portion 42 of the strip will flex to an arcuate contour dictated by the engagement of decorative material 16 with imperfections 18 and 20 in the manner illustrated by broken lines 48 in FIG. 3. While this arcuate configuration may not conform exactly with the designed contour of the outer surfaces of the body portion, it will be appreciated that it is a substantially uniform arcuate contour and is devoid of the deviations imparted thereto when the cover strip is pressed against and bonded in its entirety to the outer surface in the manner described hereinabove with regard to FIGS. 1 and 2. Therefore, the effect of imperfections 18 and 20 on the appearance of the decorative cover strip is advantageously minimized.

While the structure illustrated in FIG. 3 minimizes the effect or appearance of imperfections in the outer surface of the body portion, it may be desirable to further minimize or eliminate the appearance or effect of such imperfections. This can be achieved by the trim strip structure illustrated in FIG. 4. More particularly, the outer surface of the body portion 10 of the trim strip is provided, such as during the extrusion thereof, with a longitudinally extending recess 50 having a lateral width corresponding to the lateral width of intermediate portion 42 of cover strip 12. Accordingly, the recess provides ledges 52 extending longitudinally of the trim strip in underlying relationship with respect to edge portions 40 of cover strip 12. Edge portions 40 are adhered or bonded to ledges 52 such as by an adhesive interposed therebetween or by heat sealing in the manner described above in conjunction with the description of FIG. 3. When cover strip 12 is bonded to ledges 52 the inner surface of decorative material 16 in intermediate portion 42 of strip 12 is spaced from any imperfections in the bottom surface of recess 50 such as those designated by the numerals 54 and 56. The depth of recess 50 relative to ledges 52 can vary and preferably corresponds to the extent to which imperfections are found in practice to extend outwardly from the bottom surface of the recess. While it is preferred that the recess be deep enough to prevent engagement between the imperfections and decorative material on the cover strip, it will be appreciated that the intermediate portion of the cover strip will take its own form in a manner similar to that described above in connection with FIG. 3 should the inner surface of the decorative material engage such imperfections.

Figure 4:
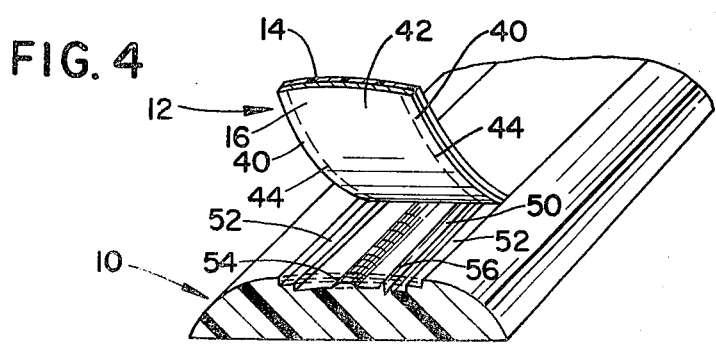
Figure 5:
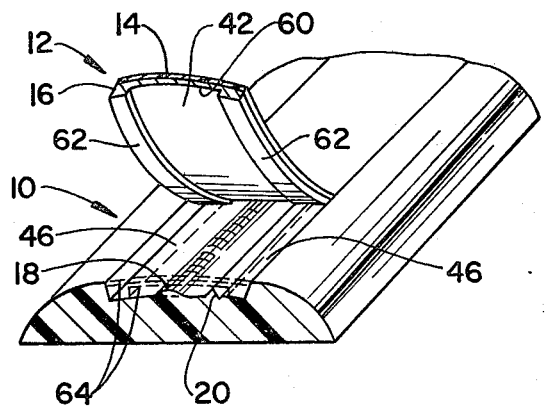

In FIG. 5, a trim strip structure is illustrated which is an alternative to the structure illustrated in FIG. 4. In this respect, the inner surface of decorative material 16 is provided with a longitudinally extending recess as opposed to providing the recess in the outer surface of the body portion. The recess in decorative material 16, designated by the numeral 60, has a lateral width corresponding to that of the intermediate portion 42 of cover strip 12 and provides edge portions 62 while overlie and correspond in lateral width to portions 46 of the outer surface of the body portion. Edge portions 62 are adhesively bonded or heat sealed to the underlying portions of the outer surface of body 10, and recess 60 has a bottom wall which is then spaced from the outer surface of the body portion as indicated by broken lines 64 in FIG. 5. It will be appreciated that the depth of recess 60 can be varied. Generally, the transparent film 14 is polyethylene terephthalate having a thickness of from 0.020 inch to 0.120 inch, and the decorative coating is vapor deposited metal having a thickness of up to 0.020 inch. The desired metallic appearance and stability of the metallized film can be achieved if the metal coating is of a minimum thickness of about 0.0004 inch. Therefore, if a metal coating initially of a thickness of 0.020 inch is provided on the transparent plastic, a recess having a depth of about 0.0196 inch could be provided in the metal without affecting the metallic appearance or overall stability of the metallized film. The recess in the decorative material may itself accommodate imperfections in the outer surface of the body portion, and it will be appreciated that the intermediate portion of the cover strip will take its own form in the manner previously described should the bottom wall of the recess engage such imperfections.

The embodiment of FIGS. 4 and 5 provide a further advantage in conjunction with trim strips made in accordance with the present invention. In this respect, the recess, whether it be in the outer surface of the body portion or in the decorative material on the cover strip, or in both, defines a void between the body portion and cover strip which inhibits or at least substantially eliminates the possibility of a bond being produced between the decorative material and body portion during use of the trim strip. Such a latent bond could cause the appearance of imperfections previously unnoticeable. More particularly, such trim strips, especially if used as decorative and protective exterior trim for automobiles, are often exposed to ambient temperature conditions including heat during the summer time from the surrounding air or from direct exposure to the sun. With the embodiment illustrated in FIG. 3, such heat could over a period of time cause the intermediate portion 42 of cover strip 12 to more closely conform to the underlying contour of the outer surface of the body portion and accordingly to the contour defined by imperfections 18 and 20. Upon such conformity, or an approach thereto, the cover strip could be distorted to the extent that the imperfections would become apparent. With the embodiments illustrated in FIGS. 4 and 5, however, the portion of the decorative material on the intermediate portion of the cover strip and the underlying outer surface of the body portion are spaced apart and the void therebetween advantageously reduces the likelihood of a bond occurring therebetween during use of the trim strip.

Figure 6:
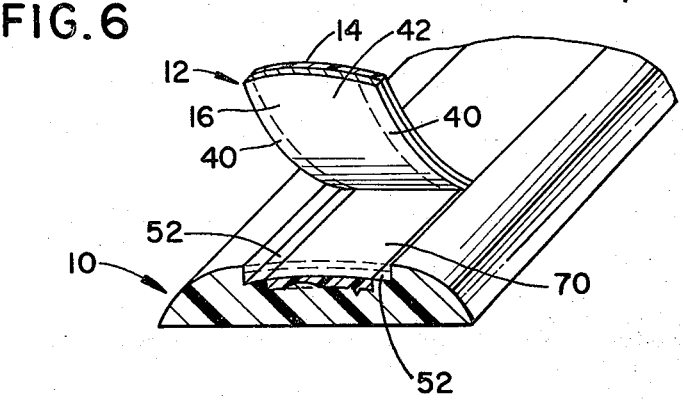
Figure 7:
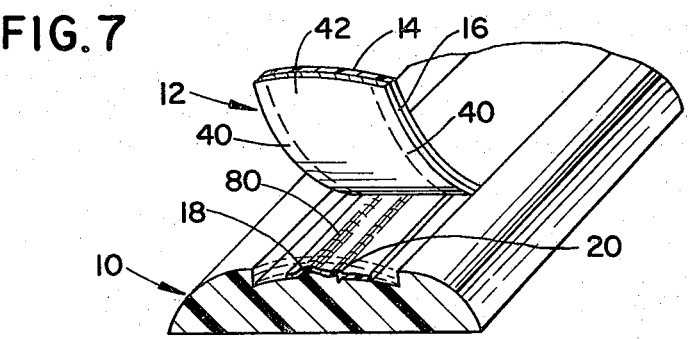

While the void provided between the cover strip and body portion in accordance with the embodiments in FIGS. 4 and 5 advantageously reduces the possibility of a bond forming therebetween, it may be desirable in certain instances to more positively prevent the occurrence of such a bond. Examples of the trim strip structures for this purpose are illustrated in FIGS. 6 and 7. With regard to FIG. 6, a trim strip structure is illustrated similar to that of FIG. 4 in that the outer surface of the body portion is provided with a longitudinally extending recess providing ledges 52 for adherence with side portions 40 of cover strip 12. In the present embodiment, however, a strip or film of adhesion barrier material 70 is provided in the recess and preferably has an outer surface corresponding in contour to the designed contour of the outer surface of the body portion which cover strip 12 overlies, although this relatively is not necessary. Adhesion barrier 70 may be a film of any material which will not bond, at least with the decorative material 16 on cover strip 12, under the temperature conditions which the trim strip assembly is expected to encounter during normal use thereof. The barrier material may also be such as to present a bond thereof with the body portion, but the latter characteristic is not necessary.

A suitable material for the barrier film 70 could be a vinyl film treated with well known abherent additives which are known in the plastics industry as antiblocking agents added to the vinyl material to prevent bonding thereof with other plastic materials or metal. Such additives include natural and manufactured waxes, metallic salts of fatty acids, and the like. Further, a barrier film could be defined by a film of vinyl coated on one or both surfaces with a material such as a calcium silicate or silica, which materials provide the vinyl with an abherent characteristic. Further a strip of suitable paper material could be disposed in the recess in those instances where the decorative material is a metal coating. Many materials suitable as an adhesion inhibiting barrier will be apparent to those skilled in the art in addition to those specifically mentioned above. In the embodiment illustrated in FIG. 6, it will be appreciated that side portions 40 of cover strip 12 are secured to ledges 52 of the body portion in a manner similar to that described hereinabove in conjunction with the preceding embodiments.

The embodiment illustrated in FIG. 7 is similar to that illustrated in FIG. 3 in that the side portions 40 of cover strip 12 are adapted to be bonded to underlying portions of the outer surface of body portion 10 in a manner whereby the intermediate portion 42 of the cover strip assumes an arcuate contour which may be dictated by underlying imperfections 18 and 20 in the outer surface. In the embodiment of FIG. 7, however, the intermediate portion of the outer surface of body 10 underlying intermediate portion 42 of cover strip 12 is provided with a coating 80 of a bond inhibiting material such as silicon which inhibits a bond between decorative material 16 and the outer surface of the body portion both during manufacture and use of a trim strip. The embodiment of FIG. 7 has the added advantage over the embodiment of FIG. 3 that adhesion between decorative material 16 and the outer surface of the body portion is inhibited during use of the trim strip and exposure thereof to high ambient temperatures which could otherwise cause a latent bond to form therebetween. It will be appreciated, of course, that the coating 80 could be applied to decorative material 16 in the intermediate portion of cover strip 12 rather than to the outer surface of the body portion.

The imperfections referred to hereinabove produce a more pronounced appearance in conjunction with trim strips of the character wherein the cover strip is a transparent plastic carrying a coating of metal thereon which defines the decorative material. This is due to the fact that the specularity of the metallic surface visible through the transparent plastic tends to reflect or exaggerate such imperfections. However, such imperfections also detract from the decorative appearance of trim strips wherein the decorative material is defined other than by a metal coating. The decorative material may, for example, be a paint or lacquer coating provided on the transparent plastic to achieve a desired decorative effect such as wood graining or the like. Accordingly, it will be appreciated that trim strips made in accordance with the present invention provide the advantages enumerated herein regardless of the nature of the decorative material. Most often, and preferably, the body portion of the trim strip is an extruded vinyl material, such as polyvinyl chloride, the transparent film is polyethylene terephthalate, and the decorative material is a coating of metal vapor deposited on the polyethylene terephthalate.

While the trim strip structures illustrated and described herein are of a particular cross-sectional configuration, it will be appreciated that the principles of the present invention are applicable to other structural configurations. It will be appreciated too that the transparent film and decorative material defining the cover strip can be of a lateral width relative to the overall width of the body portion which is greater than or less than the width of the cover strip in the embodiments illustrated herein. For example, the cover strip can be of a width to completely overlie the outer surface of the body portion between the longitudinal side edges thereof, whereby the portion of the trim strip which is exposed when the trim strip is mounted has a decorative appearance which in its entirety is provided by the cover strip. As another example, two or more cover strips can be provided to overlie longitudinally extending and laterally spaced apart portions of the outer surface of the body portion of the strip, the edge portions of each cover strip being adhered to the body portion as described herein. In these examples as well as the embodiments described herein the cover strip overlies the outer surface of the body portion of the trim strip. Accordingly, it is to be understood that the term outer surface of the body portion as used herein and in the accompanying claims is intended to mean the surface of the body portion which underlies the cover strip between the lateral edges of the cover strip.

It will be further appreciated that the intermediate portion of the cover strip is the only portion thereof which necessarily carries the decorative material. Such cover strips, especially if they are metallized plastic film, are purchased in sheet form and cut to the desired width, whereby the decorative material is laterally coextensive with the plastic film. The cover strip could, however, be produced or modified so that the side portions bonded to the outer surface of the body portion are free of decorative material. Further, the side portions could in such case be provided with strips of plastic film of suitable thickness to achieve spacing of the decorative material from the outer surface of the body portion or to achieve the relationship between the cover strip and outer surface which is provided by the decorative material along the side portions in the embodiments described herein.

As many possible embodiments of the present invention may be made and as many possible changes may be made in the embodiments herein described, it is to be distinctly understood that the foregoing descriptive matter is to be interpreted merely as illustrative of the present invention and not as a limitation.

Having thus described my invention, I claim:

1. A decorative trim strip comprising an elongated body portion of a synthetic resin, said body portion having generally parallel side edges, a bottom surface, and a top surface, a cover strip overlying said top surface, said cover strip having outer and inner surfaces and side surfaces perpendicular to said outer and inner surfaces, said inner surface of said cover strip facing said top surface of said body portion, said cover strip including a film of transparent plastic and a layer of decorative material bonded to the inner surface of said film and visible therethrough, said body portion in the direction between said top surface and said bottom surface being of a thickness greater than the thickness of said cover strip in the direction between said inner and outer surfaces thereof, said inner surface of said cover strip having longitudinally extending marginal edge portions and an intermediate portion laterally therebetween, said marginal edge portions each extending laterally inwardly along the inner surface of said cover strip from the corresponding one of said side surfaces, said marginal edge portions further being parallel to the overlying portion of said outer surface of said cover strip, and means bonding only said marginal edge portions of said cover strip to said top surface of said body portion.

2. The decorative trim strip according to claim 1 and means between said layer of decorative material and said top surface of said body portion to inhibit adhesion of said decorative material in said intermediate portion of said cover strip to said top surface of said body portion.

3. The decorative trim strip according to claim 2, wherein said inhibiting means is a coating on one of said layer of decorative material and said top surface of said body portion.

4. The decorative trim strip according to claim 2, wherein said inhibiting means is a film of material inert to adhesion with at least said decorative material.

5. The decorative trim strip according to claim 1, and a recess in said top surface of said body portion, said recess having a bottom surface spaced from and underlying the decorative material on said intermediate portion of said cover strip.

6. The decorative trim strip according to claim 5, and means in said recess inert to adhesion with said decorative material.

7. The decorative trim strip according to claim 1 and one of said layer of decorative material and said top surface of said body portion having a recess therein providing a void therebetween.

8. The decorative trim strip according to claim 7, wherein said recess is in said layer of decorative material.

9. The decorative trim strip according to claim 8, wherein said film is polyethylene terephthalate and said layer of decorative material is a coating of metal thereon.

10. The decorative trim strip according to claim 7, wherein said film is polyethylene terephthalate and said layer of decorative material is a coating of metal thereon, said recess being in said top surface of the body portion.

11. The decorative trim strip according to claim 10, and means in said recess inert to adhesion with at least said metal.

12. The decorative trim strip according to claim 1, wherein said body portion is a vinyl resin material, said film is polyethylene terephthalate and said layer of decorative material is a metal coating on said polyethylene terephthalate, and a coating on one of said metal and said top surface of said body portion to inhibit adhesion of said metal in said intermediate portion to said vinyl resin material.

* * * * *